United States Patent [19]
Yamada

[11] Patent Number: 5,906,134
[45] Date of Patent: May 25, 1999

[54] GENEVA DRIVE MECHANISM

[76] Inventor: Hiromitsu Yamada, 1-10-16, Shibukawacho, Higashiosaka-shi, Osaka, Japan

[21] Appl. No.: 08/799,398

[22] Filed: Feb. 12, 1997

[30] Foreign Application Priority Data

Feb. 19, 1996 [JP] Japan ........................................ 8-30247

[51] Int. Cl.⁶ ..................................................... F16H 55/17
[52] U.S. Cl. ................................. 74/436; 74/84 R; 74/820
[58] Field of Search ..................................... 74/436, 84 R, 74/820; 384/516

[56] References Cited

U.S. PATENT DOCUMENTS

| | | | |
|---|---|---|---|
| 3,855,873 | 12/1974 | Fletcher et al. | 74/436 |
| 4,334,721 | 6/1982 | Satoh et al. | 384/516 |

FOREIGN PATENT DOCUMENTS

| | | | |
|---|---|---|---|
| 36595 | 10/1919 | Germany | 74/436 |
| 322225 | 6/1920 | Germany | 74/436 |
| 3610030 | 4/1936 | Japan . | |
| 60-64357 | 5/1985 | Japan . | |
| 6-40507 | 5/1994 | Japan . | |

OTHER PUBLICATIONS

Database WPI, week 8644, Derwent Publications Ltd., London, GB; AN 86–290233, XP002032226 & Su 1 216 516 A (Ivanov S A), Nov. 13, 1986.

*Primary Examiner*—John A. Jeffery
*Assistant Examiner*—David Fenstermacher
*Attorney, Agent, or Firm*—Webb Ziesenheim Logsdon Orkin & Hanson, P.C.

[57] ABSTRACT

A Geneva drive mechanism includes a Geneva gear having arcuate recesses and radially outwardly opening slots arranged alternately in a circumferential direction thereof, and a driving member having an engaging element for engaging the slots. The driving member has a cam. The cam includes a plurality of rolling elements rotatable and movable circumferentially of the driving member. The rolling elements are arranged in a portion of the cam which contacts the arcuate surfaces when the engaging element is disengaged from the slots and rotation of the Geneva gear is restricted.

18 Claims, 6 Drawing Sheets

GENEVA DRIVE MECHANISM

BACKGROUND OF THE INVENTION

1. Field of the Invention

This invention relates to a Geneva drive mechanism including a driven member defining arcuate recesses and radially outwardly opening slots arranged in a rotating direction, and a driving member having an engaging element for engaging the slots of the driven member to rotate the driven member intermittently by a predetermined angle.

2. Description of the Related Art

The Geneva drive mechanism has a function to convert continuous rotation into intermittent rotation by a set angle. That is, when a continuous rotation is inputted, the Geneva drive mechanism outputs an alternate repetition of rotation and stoppage, i.e. a rotation through a set angle followed by a stopping period, and then a rotation through the same set angle.

Generally, this type of Geneva drive mechanism includes a driven member defining arcuate recesses and radially outwardly opening slots arranged alternately at predetermined intervals circumferentially of the driven member, and a driving member for intermittently rotating the driven member. Such a Geneva drive mechanism is disclosed in Japanese Utility Model Publications Kokai No. S60-64357 and No. H6-40507, for example. In the prior constructions disclosed therein, the driving member includes an engaging roller acting as the engaging element for successively engaging a plurality of slots in the driven member to rotate the driven member intermittently by a predetermined angle. This driving member further includes a plurality of turn rollers rotatable about pivotal axes fixed to the driving member for contacting arcuate surfaces of the arcuate recesses in the driven member when the engaging roller is disengaged from the slots so that the driven member does not rotate with the driving member.

In the Geneva drive mechanism having the above construction, when, with rotation of the driving member, the engaging roller engages one of the slots in the driven member, the driven member is rotated until the engaging roller is disengaged from the slot. Thereafter, the rotation of the driven member is suspended until the engaging roller engages the next slot in the rotating direction.

With the driven member at rest, the turn roller of the driving member, while contacting the arcuate surface of one of the arcuate recesses of the driven member, rotate about the pivotal axes and move with the driving member along the arcuate surface.

According to the conventional Geneva drive mechanism, as noted above, when the driven member is at rest and the driving member is in rotation, the turn rollers move along the arcuate surface one of the arcuate recesses of the driven member. The driving member may include a cam defining a rotation restricting surface movable in sliding contact with the arcuate surfaces of the arcuate recesses of the driven member at rest (see FIG. 4 of Japanese Utility Model Publications Kokai No. H6-40507, for example). Compared with this construction, the foregoing construction has an advantage of reducing friction between the driving member and the driven member when the latter is at rest during intermittent rotation. With the reduced friction, the driving member is smoothly rotatable free of seizure, the Geneva drive mechanism has an extended life, and a reduction in energy consumption may be achieved in relation to rotation of the driving member itself.

However, in the conventional Geneva drive mechanism, a reaction is applied between the turn rollers and the pivotal axes of the driving member rotatably supporting the rollers when the rollers in rotation move with the driving member along the arcuate surfaces of the driven member. The positions where the reaction is applied are subjected to a strong frictional force. Thus, there is room for improvement in achieving an extended life of the Geneva drive mechanism as well as energy saving.

SUMMARY OF THE INVENTION

This invention has been made having regard to the state of the art noted above, and its object is to provide a Geneva drive mechanism with an improved structure for supporting rolling elements arranged on the driving member, thereby to promote an extended life and energy saving compared with the prior art.

The above object is fulfilled, according to this invention, by a Geneva drive mechanism including, instead of the rollers rotatable about pivotal axes fixed to the driving member, rolling elements arranged in a rolling element guide to be rotatable and movable circumferentially of the driving member.

According to the above construction, when the driven member is at rest during intermittent rotation with the engaging element disengaged from the slots, the rolling elements mounted in the rolling element guide formed in the cam of the driving member rotate and move along the guide while in contact with the arcuate surface of the arcuate recess of the driven member. This movement of the rolling elements has the effect of reducing friction between the driving member and driven member. The driving member may be driven smoothly without seizure and chattering.

Consequently, compared with the prior art, the Geneva drive mechanism has an extended life and energy saving may be promoted.

PREFERRED EMBODIMENTS OF THE INVENTION

Preferred embodiments of this invention will be described hereinafter with reference to the drawings.

A Geneva drive mechanism in a preferred embodiment shown in FIGS. 1 through 7 includes a driven member 2 having an output shaft 1, and a driving member 4 having an input shaft 3 for intermittently rotating the driven member 2. These rotatable members 2 and 4 are rotatably supported by a fixed frame (not shown) through the output shaft 1 and input shaft 3. As seen, the output shaft 1 and input shaft 3 extend parallel to each other.

In this specification, directions parallel to the output shaft 1 and input shaft 3 are called axial directions. Radial directions and circumferential direction of the driven member 2 are defined as directions extending toward the above shafts in planes perpendicular to the axial directions, and a direction perpendicular to the radial directions, respectively. Radial directions and circumferential direction of the driving member 4 are defined likewise.

As used in this specification, intermittent rotation means a continuous rotation through a predetermined angle followed by a rotation for a set time or a repetition thereof.

Figure 6:
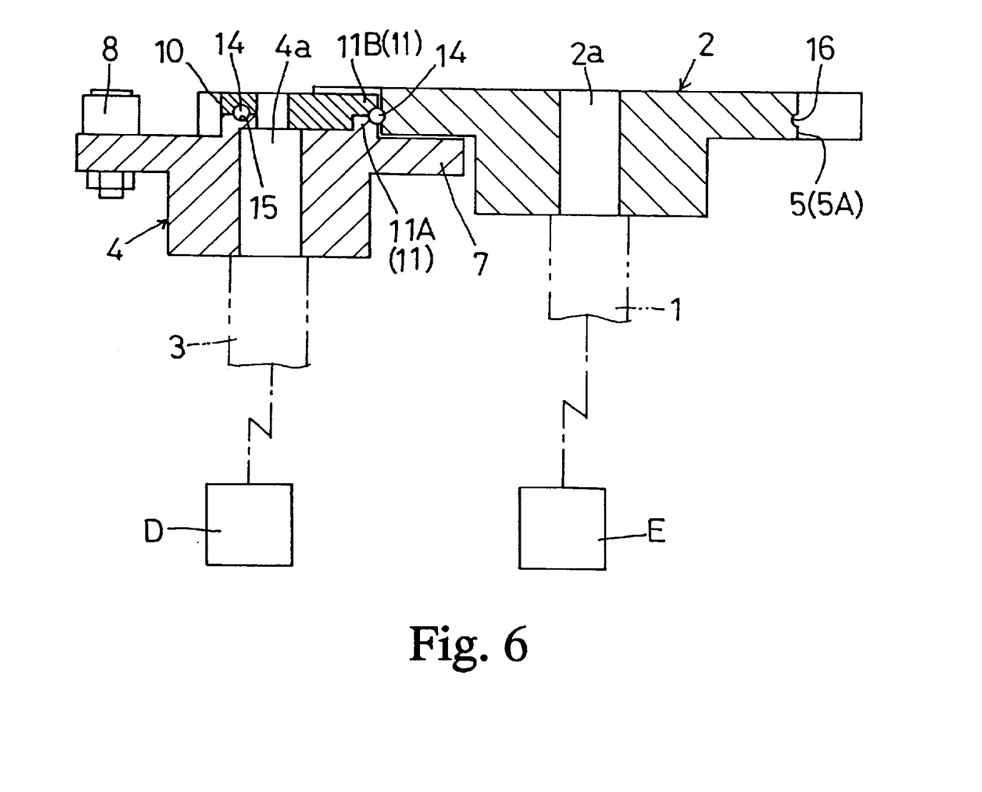
FIG. 6 is a section taken on line VI—VI of FIG. 5.

As shown in FIG. 6, the input shaft 3 is rotatable by a drive system D having a drive actuator such as an electric motor or hydraulic motor. Torque output of the drive system D is transmitted to the driving member 4 through the input shaft 3 to rotate the driving member 4. The driving member 4 intermittently rotates the driven member 2, which is transmitted through the output shaft 1 to an input E of a processing apparatus or the like. Such a Geneva drive mechanism is useful, for example, in repeating the same process at each set angle circumferentially of a cylindrical object. However, the Geneva drive mechanism has wide application without being limited to the above example.

As shown in FIGS. 1 through 5, the driven member 2 defines arcuate recesses 5 of identical shape and radially outwardly opening slots 6 arranged alternately in the circumferential direction thereof. As seen from FIGS. 1 through 5, the arcuate recesses 5 have central portions thereof situated close to the output shaft 1 of the driven member 2. Each slot 6 is U-shaped and extends radially inwardly from an opening formed peripherally of the driven member 2, with inner surfaces thereof defining an opposed pair of guide surfaces. In this embodiment, the arcuate recesses 5 and slots 6 are provided six each.

The driven member 2 has the output shaft 1 fixed in a bore 2a formed centrally thereof. The driven member 2 is called a Geneva gear hereinafter.

The Geneva gear 2 is formed of high carbon chrome bearing steel, and peripheral portions of the arcuate recesses 5 have been quenched. The high carbon chrome bearing steel preferably has chemical ingredients based on SUJ2 of the Japanese Industrial Standards (JIS). Specifically, as preferred chemical ingredients of the high carbon chrome bearing steel used in this embodiment, C is contained in 0.95–1.10%, Si in 0.15–0.35%, Mn in 0.50% or less, P in 0.025% or less, S in 0.025% or less, and Cr in 1.30–1.60%. Mo must not exceed 0.08%. Other elements may be added in 0.25% or less.

Figure 5:
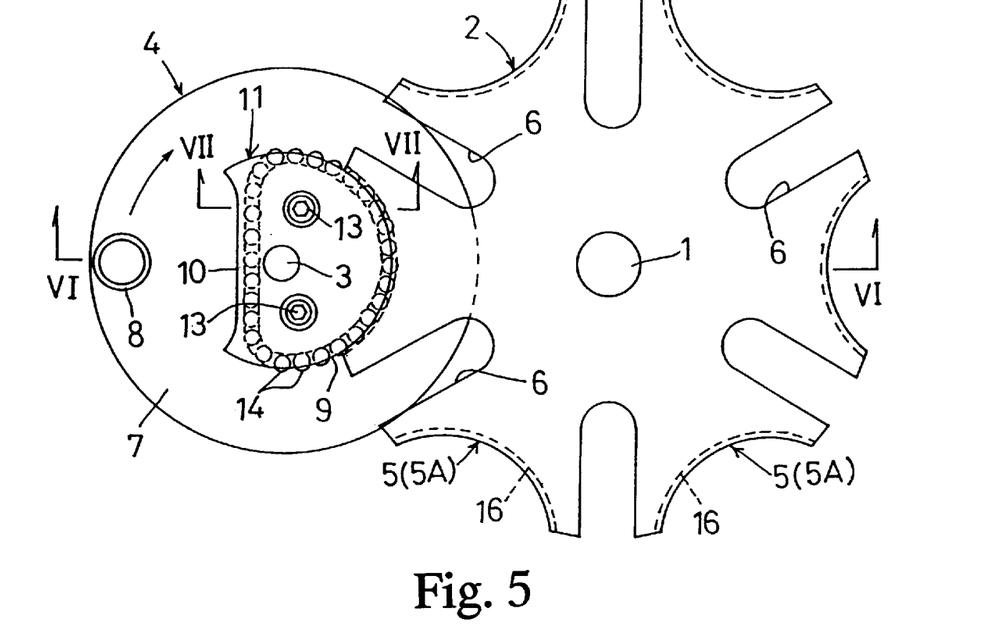
FIG. 5 is a plan view of the Geneva drive mechanism with the driven member at rest during the intermittent rotation.

As shown in FIG. 6, the driving member 4 includes a disk-shaped base 7. One engaging roller 8 is rotatably supported in a peripheral position on one surface of the base 7 to act as an engaging element for successively engaging the six slots 6 in the Geneva gear 2. Since the Geneva gear 2 has six slots 6, the Geneva gear 2 is intermittently rotatable at the set angle of 60 degrees by engagement between the engaging element of driving member 4 and these slots 6. A peripheral portion of the base 7 overlaps the Geneva gear 2 when seen in the axial direction. As shown in FIG. 5, a cam 11 is mounted in a central portion on the one surface of the base 7. The cam 11 defines an arcuate rotation restricting surface 9 which is movable relative to and along an arcuate surface 5A of one of the arcuate recesses 5 of Geneva gear 2 when the Geneva gear 2 stops in intermittent rotation, with the engaging roller 8 disengaged from the slots 6.

Figure 3:
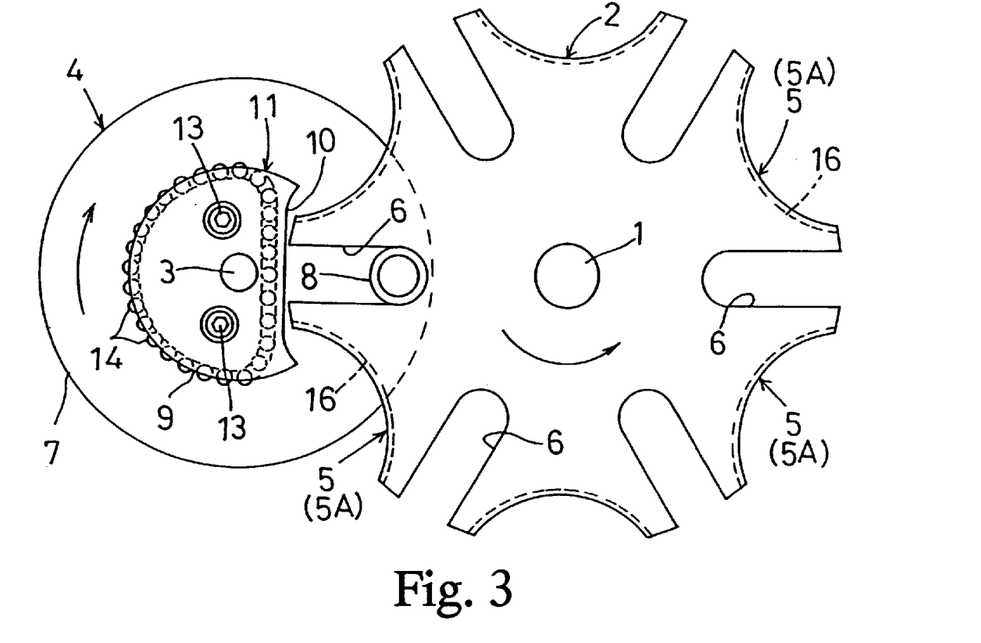
FIG. 3 is a plan view of the Geneva drive mechanism with a driven member in intermittent rotation.

In this specification, the state in which the engaging element 8 engages one of the slots 6 in the driven member 2 whereby the driven member 2 rotates with the driving member 4 is called the first state. The state in which the engaging element 8 is disengaged from the slots 6 and the driven member 2 stands still while the driving member 4 is in rotation is called the second state. As shown in FIG. 3, the cam 11 defines a relative rotation permitting surface 10 which is out of contact with the Geneva gear 2 to permit rotation of the Geneva gear 2 in the first state in which the engaging roller 8 is engaged with one of the slots 6.

The driving member 4 has a bore 4a formed in a central portion thereof and extending through the base 7 and cam 11, and the input shaft 3 is fixed in the bore 4a. The base 7 and the cam 11 constituting the driving member 4 are formed of high carbon chrome bearing steel (SUJ2).

As shown in FIGS. 2 through 5, the rotation restricting surface 9 of the cam 11 is formed of an arcuate surface of approximately 255-degree range around a rotational axis of the base 7. The rotation restricting surface 9 has a slightly smaller radius than each arcuate recess 5 of Geneva gear 2. The relative rotation permitting surface 10 of the cam 11 is continuous with opposite ends in the circumferential direction of the rotation restricting surface 9, and opposed to the rotation restricting surface 9 across the rotational axis. The relative rotation permitting surface 10 includes a straight surface extending through an intermediate range thereof and opposed to the engaging roller 8. Thus, the cam 11 as a whole is D-shaped as seen in the axial direction, which is formed by the arcuate rotation restricting surface 9 and the substantially straight relative rotation permitting surface 10.

Figure 7:
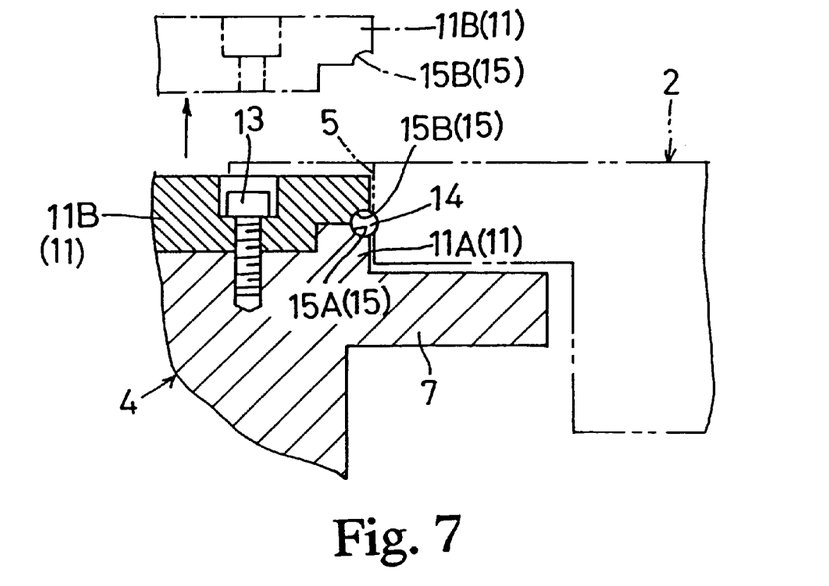
FIG. 7 is a section taken on line VII—VII of FIG. 5.

As shown in FIGS. 6 and 7, the cam 11 has a split structure including a first cam member 11A formed integral with the base 7, and a second cam member 11B fitted in the direction of the rotational axis in the first cam member 11A and tightened thereto with a pair of bolts 13. The first cam member 11A defines a recess for receiving the second cam member 11B.

Between the pair of these cam members 11A and 11B opposed to each other in the direction of the rotational axis, are grooves 15A and 15B for forming an annular groove 15 acting as a rolling element guide for holding a plurality of rolling elements 14 to be rotatable and movable circumferentially of the driving member 4. The annular groove 15 includes an inner guide surface 15c located inwardly of the rolling elements 14. The inner guide surface 15c includes points 15d and 15e having a radius of curvature greater than the radius of the rolling elements 14. The radius of curvature of the inner guide surface 15c being greater than the radius of the rolling elements 14 facilitates movement of the rolling elements 14 circumferentially around the driving member 4. In this embodiment, balls 14 formed of high carbon chrome bearing steel (SUJ2) are used as the rolling elements 14. As seen from FIG. 7, the annular groove 15 has an arcuate section corresponding to the shape of balls 14 acting as the rolling elements. As seen from FIGS. 1 through 5, the annular groove 15 has a continuous, semicircular form extending along the rotation restricting surface 9 and relative rotation permitting surface 10 as seen in the axial direction. The rolling element guide has a substantially straight portion and a substantially semicircular-shaped portion, wherein at a transitional point between the substantially straight portion and the substantially semicircular-shaped portion the radius of curvature of the rolling element guide is greater than the radii of the rolling elements 14 thereby facilitating movement of the rolling elements 14 circumferentially around the driving member 4.

The annular grove 15 opens radially outwardly in the region of the rotation restricting surface 9. Consequently, the balls 14 protrude radially outwardly from the rotation restricting surface 9 of the cam 11 to contact the arcuate surface 5A of one of the arcuate recesses 5 of Geneva gear 2 in the second state in which the Geneva gear 2 stops during intermittent rotation.

The annular groove 15 has an opening width in the axial direction smaller than the diameter of balls 14, so that the balls 14 never fall out of the annular groove 15 through this opening.

The annular groove 15 is in the form of a straight tunnel through the cam 11 in the region of the relative rotation permitting surface 10. Consequently, the balls 14 are completely contained in the cam 11 in the region of the relative rotation permitting surface 10 instead of being exposed to the outside.

The arcuate surface 5A of each arcuate recess 5 of Geneva gear 2 includes a guide groove 16 extending through an entire circumferential length thereof to be opposed to the balls 14 acting as the rolling elements exposed from the rotation restricting surface 9. The guide groove 16 has an arcuate section corresponding to the section of balls 14. Thus, the balls 14 and guide groove 16 make an arcuate contact with each other.

According to the Geneva drive mechanism having the above construction, when the input shaft 3 is rotated by the output from the drive system D, the base 7 constituting the driving member 4 rotates therewith. In the course of rotation of the base 7, the engaging roller 8 engages one of the slots of Geneva gear 2.

Figure 1:
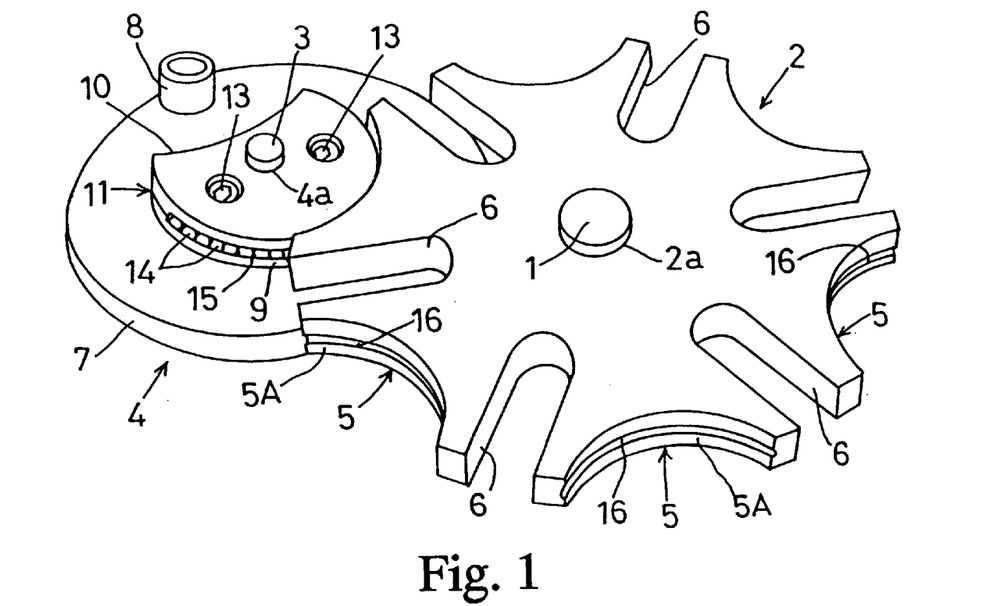
FIG. 1 is a perspective view of an entire Geneva drive mechanism according to this invention.
Figure 2:
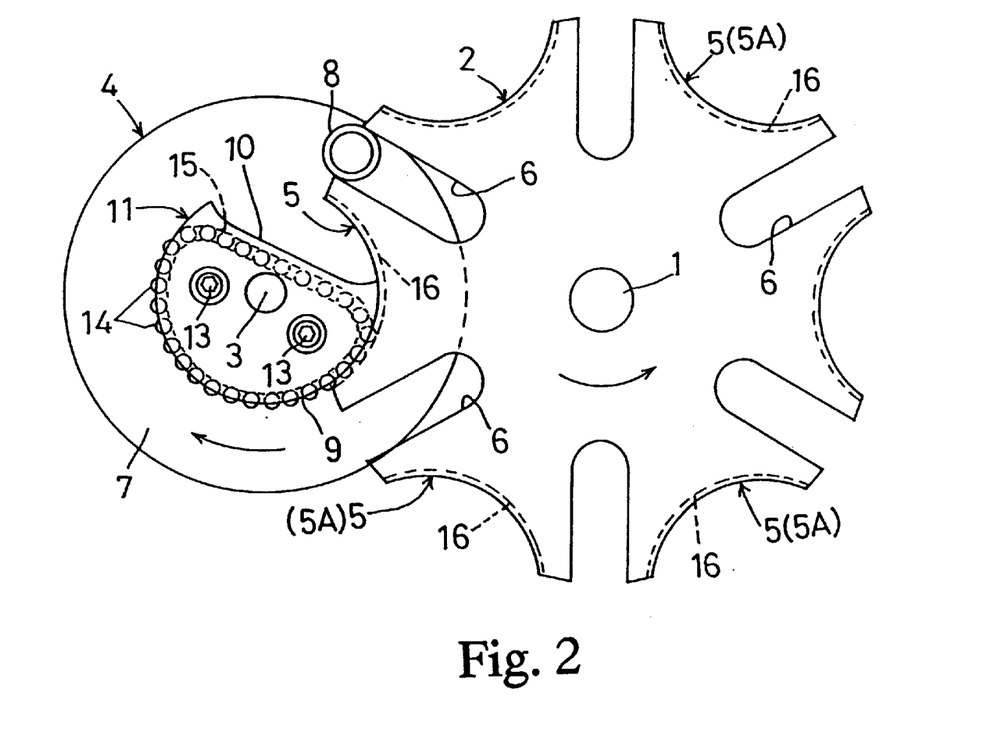
FIG. 2 is a plan view of the Geneva drive mechanism with an engaging element engaging a slot.
Figure 4:
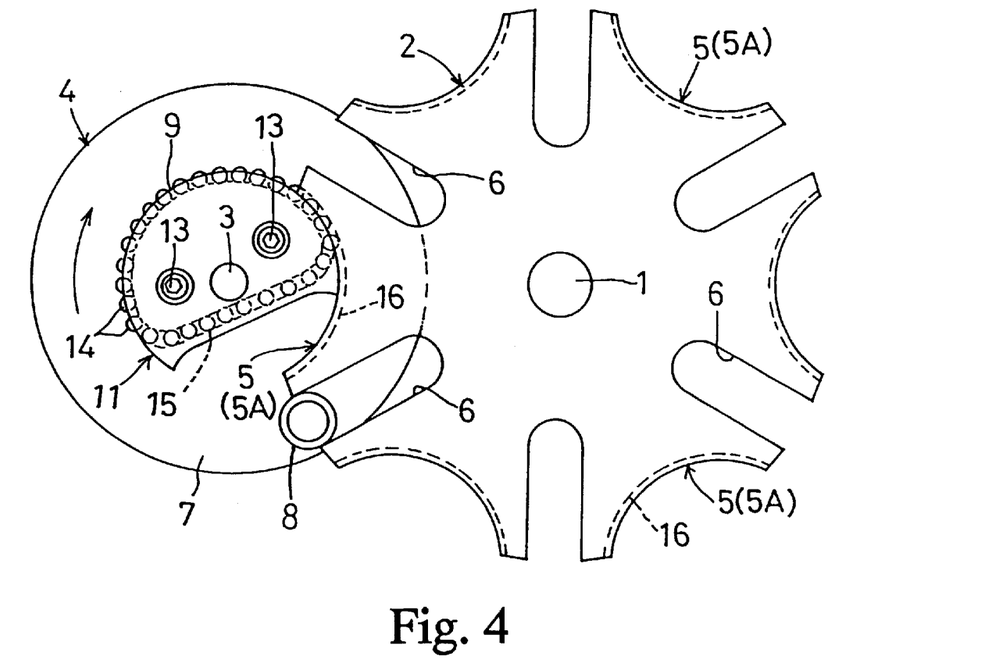
FIG. 4 is a plan view of the Geneva drive mechanism with the engaging element disengaging from the slot.

In this state, as shown in FIGS. 2 through 4, the relative rotation permitting surface 10 of the cam 11 is opposed to the Geneva gear 2 to permit relative rotation between the cam 11 and Geneva gear 2 and to forcibly rotate the Geneva gear 2 by 60 degrees by the engagement between engaging roller 8 and slot 6.

The friction due to the contact between the engaging roller 8 and the peripheral walls of the slot 6 is reduced by rotation of the engaging roller 8.

Thereafter the engaging roller 8 disengages from the slot 6 and the base 7 completes one rotation. The rotation of Geneva gear 2 is suspended until the engaging roller 8 engages the next slot 6 in the rotating direction.

As shown in FIG. 5, from the time the engaging roller 8 of the driving member 4 disengages from the slot 6 of the Geneva gear 2 until the engaging roller 8 engages the next slot 6, i.e. during a stopping period of the Geneva gear 2, the rotation restricting surface 9 of the cam 11 moves close and in opposed relationship to at least a half length in the circumferential direction of the arcuate surface 5A of the arcuate recess 5 of the Geneva gear 2 next to the slot 6 just disengaged. During this period, therefore, the rotation restricting surface 9 of the cam 11 lies close and opposed to at least a half length in the circumferential direction of the arcuate surface 5A of the Geneva gear 2, and the balls 14 arranged in the annular groove 15 of the cam 11 and exposed from the rotation restricting surface 9 contact the guide groove 16 formed in the arcuate surface 5A of the Geneva gear 2, thereby restricting forward and backward rotations of the Geneva gear 2.

When the Geneva gear 2 is at rest during intermittent rotation, the balls 14 contacting the guide groove 16 formed in the arcuate surface 5A of the arcuate recess 5 of Geneva gear 2 rotate under contact pressure and move along the annular groove 15 in a way to circulate circumferentially through the annular groove 15. Thus, hardly any friction occurs between the arcuate surfaces 5A of the arcuate recess 5 of Geneva gear 2 and the rotation restricting surface 9 of the cam 11.

[Other Embodiments]

Figure 8:
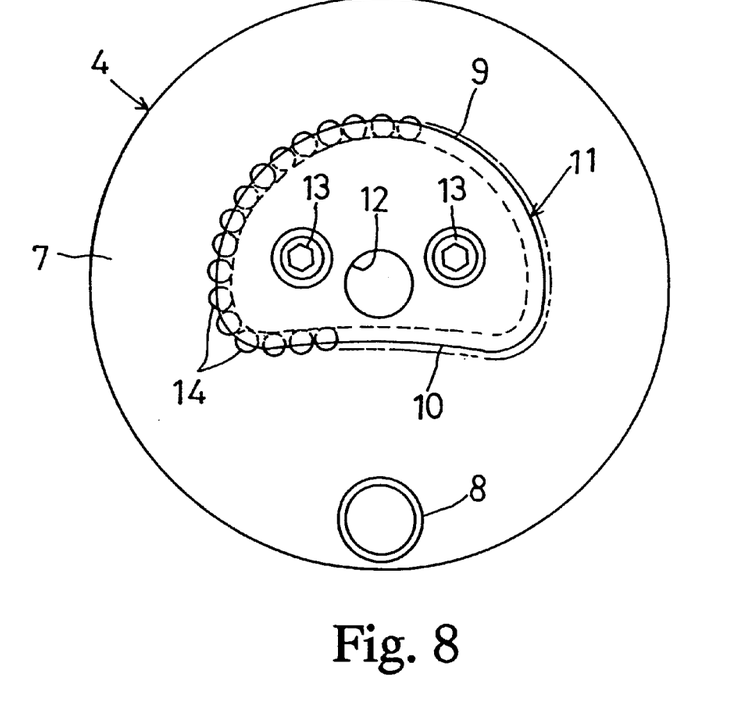
FIG. 8 is a plan view of a driving member in another embodiment.

FIG. 8 shows another embodiment of the driving member 4 modified from the first embodiment. In this embodiment, the cam 11 of the driving member 4 is chamfered to arcuate shape at transitional portions between rotation restricting surface 9 and relative rotation permitting surface 10. As shown in FIG. 8, the balls 14 acting as the rolling elements mounted in the annular groove 15 of the cam 11 to be rotatable and movable circumferentially of the driving member 4 may be exposed to the outside over the entire circumference of rotation restricting surface 9 and relative rotation permitting surface 10.

The other aspects are the same as in the foregoing preferred embodiment.

Figure 9:
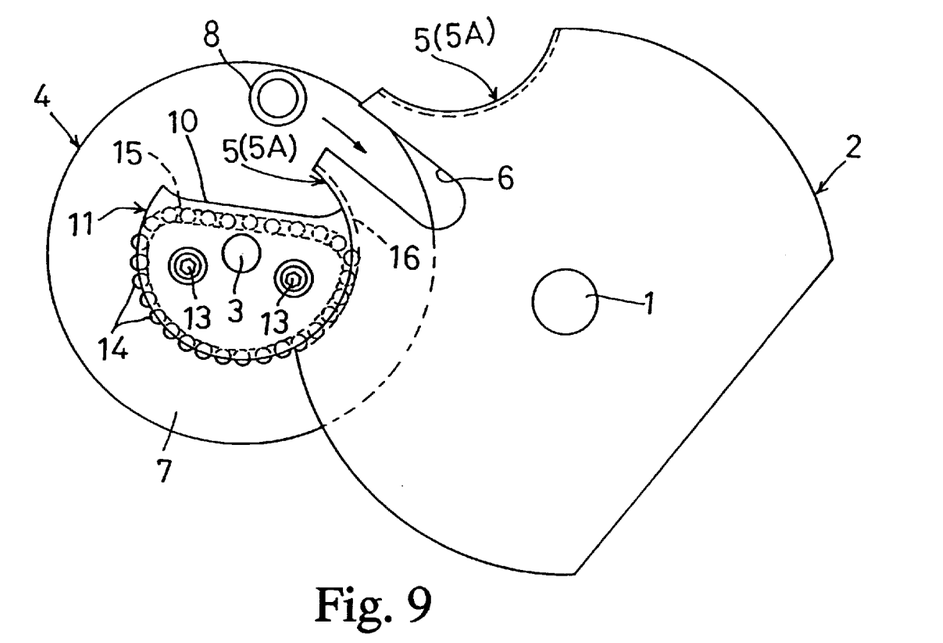
FIG. 9 is a plan view of a Geneva drive mechanism in a further embodiment.
Figure 10:
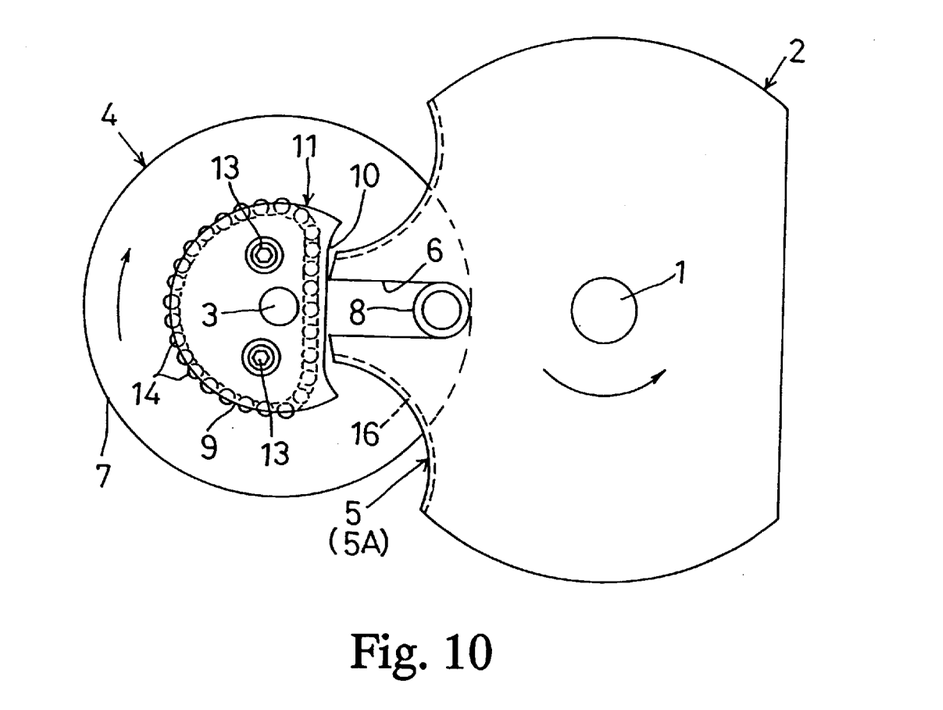
FIG. 10 is a plan view of the Geneva drive mechanism shown in FIG. 9, with a driven member in intermittent rotation.
Figure 11:
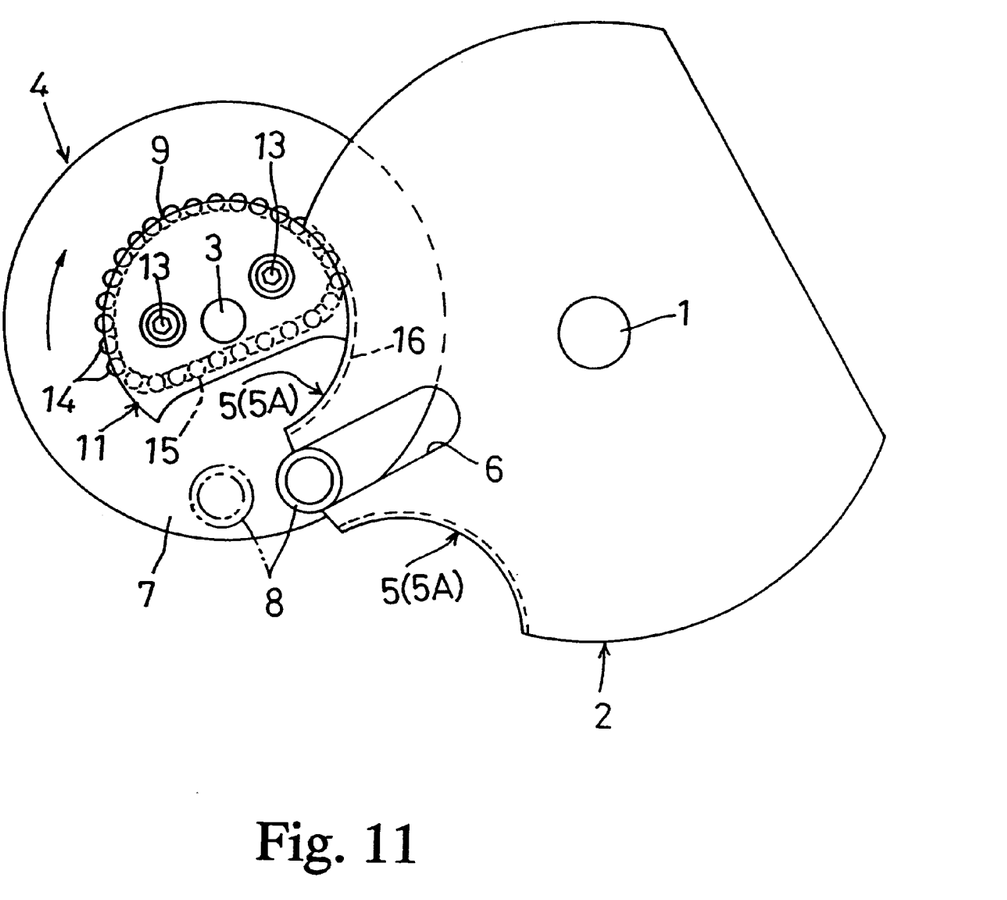
FIG. 11 is a plan view of the Geneva drive mechanism in the further embodiment, with an engaging element disengaging from a slot.

FIGS. 9 through 11 show a Geneva drive mechanism in a further embodiment of this invention. The Geneva gear 2 acting as the driven member has, arranged in the rotating direction, one slot 6 cut in U-shape opening radially outwardly and two arcuate recesses 5 of identical shape opposed to each other across the slot 6. In this embodiment, the driving member 4 is reciprocable by the drive system D between a position immediately before the engaging roller 8 rotatably supported by the driving member 4 engages the slot 6 in the Geneva gear 2 and a position immediately after the engaging roller 8 disengages from the slot 6 of Geneva gear 2. The other aspects are the same as in the foregoing preferred embodiment.

According to the Geneva drive mechanism having the above construction, when the drive system D rotates the driving member 4 in one direction, the engaging roller 8 of the driving member 4 engages the slot 6 of Geneva gear 2 to rotate the Geneva gear 2 in one direction. When the engaging roller 8 disengages from the slot 6, the rotation restricting surface 9 of the cam 11 of the driving member 4 slightly rotates relative to the arcuate space 5A of one of the arcuate recesses 5 of Geneva gear 2 standing still. Then the driving member 4 is stopped.

Subsequently, the drive system D rotates the driving member 4 in the opposite direction. With the opposite rotation of the driving member 4, the engaging roller 8 engages the slot 6 of Geneva gear 2 to rotate the Geneva gear 2 in the opposite direction. When the engaging roller 8 disengages from the slot 6, the rotation restricting surface 9 of the cam 11 of the driving member 4 slightly rotates relative to the arcuate surface 5A of the other arcuate recess 5 of Geneva gear 2 standing still. Then the driving member 4 is stopped By repeating the above reciprocal rotation of the driving member 4, the Geneva gear 2 is reliably rotated reciprocally through a fixed stroke.

The other aspects are the same as in the foregoing first embodiment.

The foregoing preferred embodiment and other embodiments may be modified as follows:

(1) The driven member (Geneva gear) 2 is not limited to the one having six recesses 5 and six slots 6 arranged alternately. For example, the number of recesses 5 and slots 6 arranged alternately may be four or five each, or may be seven or more each.

(2) The engaging element 8 may comprise a stationary pin erected on one surface of the base 7 of the driving member 4.

(3) Two or more engaging elements 8 may be arranged equidistantly along the edge of the base 7.

(4) The range of the rotation restricting surface 9 is not limited to the angular range (approximately 225-degree range about the rotational axis) in the first embodiment. It will serve the purpose as long as the rotation restricting surface 9 of the cam 11 is opposed to at least a half length in the circumferential direction of the arcuate surface 5A of the arcuate recess 5 of the Geneva gear 2 next to the slot 6 just disengaged, from the time the engaging roller 8 of the driving member 4 disengages from the slot 6 of the Geneva gear 2 until the engaging roller 8 engages the next slot 6.

(5) The material for forming the driven member (Geneva gear) 2, driving member 4, and balls 14 acting as rolling elements, is not limited to high carbon chrome bearing steel (SUJ2), but may be stainless steel or hard synthetic resin.

(6) The rolling elements 14 are not limited to balls. The rolling elements may be cylindrical rollers, or cylindrical rollers with opposite spherical ends, if these rollers are held in the annular groove 15 to contact the arcuate surfaces 5A of the arcuate recesses 5 of Geneva gear 2 to be rotatable and movable circumferentially of the driving member 4.

(7) The invention may be implemented by using a driven member (Geneva gear) 2 without the guide grooves 16 formed in the arcuate surfaces 5A of the arcuate recesses 5.

What is claimed is:

1. A Geneva drive mechanism, comprising:
   (1) a driven member having an arcuate recess and radially outwardly opening slots arranged alternately in a circumferential direction thereof; and
   (2) a driving member having:
      (a) an engaging element for engaging said slots to drive said driven member intermittently by a predetermined angle; and
      (b) a cam defining a rotation restricting surface movable relative to and along an arcuate surface defined by said arcuate recess when said engaging element is disengaged from said slots, said cam including a plurality of rolling elements for contacting said arcuate surface, each of said rolling elements having a radius, and said cam defining a rolling element guide for holding said rolling elements to be rotatable, said rolling element guide having a substantially straight portion and a substantially semicircular-shaped portion, wherein at a transitional point between said substantially straight portion and said substantially semicircular-shaped portion the radius of curvature of said rolling element guide is greater than the radii of the rolling elements thereby facilitating movement of said rolling elements circumferentially around said driving member.

2. A Geneva drive mechanism as defined in claim 1, wherein said rolling element guide is an annular groove formed in said cam.

3. A Geneva drive mechanism as defined in claim 2, wherein said rolling elements are balls.

4. A Geneva drive mechanism as defined in claim 3, wherein said annular groove defines an opening having a width in an axial direction of said driving member smaller than a diameter of said balls.

5. A Geneva drive mechanism as defined in claim 4, wherein said rolling elements are arranged between a first cam member and a second cam member formed separately from said first cam member.

6. A Geneva drive mechanism as defined in claim 5, wherein said first cam member is formed integral with a disc-shaped base having said engaging element positioned thereon.

7. A Geneva drive mechanism as defined in claim 6, wherein said first cam member defines a recess for receiving said second cam member.

8. A Geneva drive mechanism as defined in claim 2, wherein said cam has a relative rotation permitting surface formed peripherally thereof to be out of contact with said driven member when said driven member is driven by said driving member with said engaging element engaging one of said slots, said rolling elements held in said annular groove in a region of said relative rotation permitting surface being completely contained in said cam to avoid exposure to the outside.

9. A Geneva drive mechanism as defined in claim 8, wherein said said rolling element guide is in form of a substantially straight tunnel in a region of said relative rotation permitting surface.

10. A Geneva drive mechanism as defined in claim 1, wherein, when said engaging element engages one of said slots, said rotation restricting surface is movable close and in opposed relationship to at least a half length in a circumferential direction of one of said arcuate surfaces next to said one of said slots.

11. A Geneva drive mechanism as defined in claim 1, wherein said arcuate surface defines a guide groove opposite to said rolling elements.

12. A Geneva drive mechanism as defined in claim 11, wherein said guide groove has a sectional shape corresponding to a section of said rolling elements.

13. A Geneva drive mechanism as defined in claim 1, wherein said driving member includes a disc-shaped base substantially overlapping the driven member.

14. A Geneva drive mechanism as defined in claim 1, wherein said driving member is chamfered to arcuate shape at transitional portions between said rotation restricting surface and a rotation permitting surface.

15. A Geneva drive mechanism as defined in claim 1, wherein said driving member and said rolling elements are made of a material selected from the group consisting of high carbon chrome bearing steel, stainless steel and synthetic resin.

16. A Geneva drive mechanism, comprising:
   (1) a driven member having an arcuate recess and radially outwardly opening slots arranged alternately in a circumferential direction thereof; and
   (2) a driving member having:
      (a) an engaging element for engaging said slots to drive said driven member intermittently by a predetermined angle; and
      (b) a cam defining a rotation restricting surface movable relative to and along an arcuate surface defined by said arcuate recess when said engaging element is disengaged from said slots, said cam including
         a relative rotation permitting surface which is out of contact with said driven member when said driven member is driven by said driving member with said engaging element engaging one of said slots;
         a plurality of rolling elements for contacting said arcuate surface, each of said rolling elements having a radius; and said cam further defining a rolling element guide for holding said rolling elements, said rolling element guide having a substantially straight portion and a substantially semicircular-shaped portion, wherein at a transitional point between said substantially straight portion and said substantially semicircular-shaped portion the radius of curvature of said rolling element guide is greater than the radii of the rolling elements thereby facilitating movement of said rolling elements circumferentially around said driving member.

17. A Geneva drive mechanism, comprising:

(1) a driven member having an outwardly opening slot defined between two arcuate recesses, said slot and said arcuate recesses defined at a circumferential edge of said driven member; and (2) a driving member having:
   (a) an engaging element for engaging said slot to drive said driven member; and
   (b) a cam defining a rotation restricting surface movable relative to and along an arcuate surface defined by each of said arcuate recesses when said engaging element is disengaged from said slot, said cam including:
      a relative rotation permitting surface which is out of contact with said driven member when said driven member is driven by said driving member with said engaging element engaging said slot;
      a plurality of rolling elements for contacting said arcuate surface, each of said rolling elements having a radius; and
      said cam further defining a rolling element guide for holding said rolling elements, said rolling element guide having a substantially straight portion and a substantially semicircular-shaped portion, wherein at a transitional point between said substantially straight portion and said substantially semicircular-shaped portion the radius of curvature of said rolling element guide is greater than the radii of the rolling elements thereby facilitating movement of said rolling elements circumferentially around said driving member, and
      wherein the driving member is reciprocable between a position immediately before said engaging element engages said slot and position immediately after said engaging element disengages from said slot such that said driven member is rotated reciprocally through a fixed stroke.

18. A Geneva drive mechanism as defined in claim 17, wherein said driving member is driven reciprocally by a drive system connected to an input shaft of said driving member.

* * * * *